(12) United States Patent
Doggett et al.

(10) Patent No.: US 6,180,955 B1
(45) Date of Patent: Jan. 30, 2001

(54) INTEGRATING OPTICAL COLLECTOR WITH REDUCED RE-ILLUMINATION OF PHOSPHOR SHEET

(75) Inventors: David E. Doggett, Sunnyvale; Linden J. Livoni, Los Gatos, both of CA (US)

(73) Assignee: Lumisys, Inc., Sunnyvale, CA (US)

( * ) Notice: Under 35 U.S.C. 154(b), the term of this patent shall be extended for 0 days.

(21) Appl. No.: 09/097,236

(22) Filed: Jun. 12, 1998

(51) Int. Cl.[7] .................... G01T 1/105; G03B 42/02
(52) U.S. Cl. .................... 250/586; 250/585; 250/584
(58) Field of Search .................... 250/584, 585, 250/586, 581

(56) References Cited

U.S. PATENT DOCUMENTS

| | | |
|---|---|---|
| 4,680,473 | 7/1987 | Matsuda et al. . |
| 4,743,759 | 5/1988 | Boutet . |
| 5,140,160 | 8/1992 | Boutet et al. . |
| 5,274,228 | 12/1993 | Kaplan . |
| 5,369,481 | 11/1994 | Berg et al. . |
| 5,598,008 | 1/1997 | Livoni . |

FOREIGN PATENT DOCUMENTS 6-160311  2/1994 (JP) .

*Primary Examiner*—Constantine Hannaher
*Assistant Examiner*—Albert Gagliardi
(74) *Attorney, Agent, or Firm*—Thomas Schneck; Mark Protsik

(57) ABSTRACT

An integrating optical collector with a diffusely reflective interior surface and with at least one wavelength selective absorptive filter located therein in a position that nearly bisects the interior of the collector. The filters are highly transmissive in a first wavelength band corresponding to an emission band of a storage phosphor, but highly absorptive in a second wavelength band corresponding to a stimulation band of the phosphor. The filter's wavelength selective properties and nearly bisecting position in the collector minimizes re-illumination of a phosphor at the stimulation wavelength, while permitting efficient radiation collection and detection at the emission wavelengths. A cylindrical collector with two parallel lengthwise slits permitting passage of the scan beam to the phosphor surface is preferred. Two filter plates on opposite sides of the slit may be used, which can either be parallel to each other and to the slits or oriented at an angle with respect to each other.

27 Claims, 6 Drawing Sheets

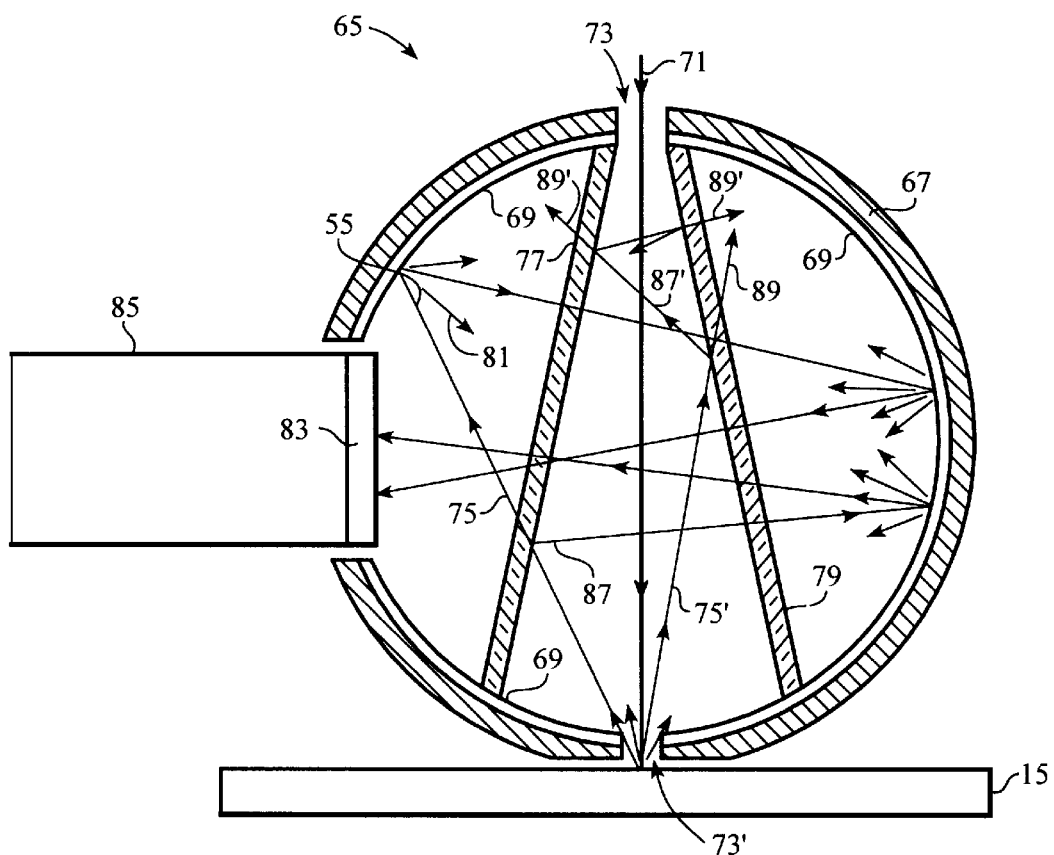
*Fig.* 5
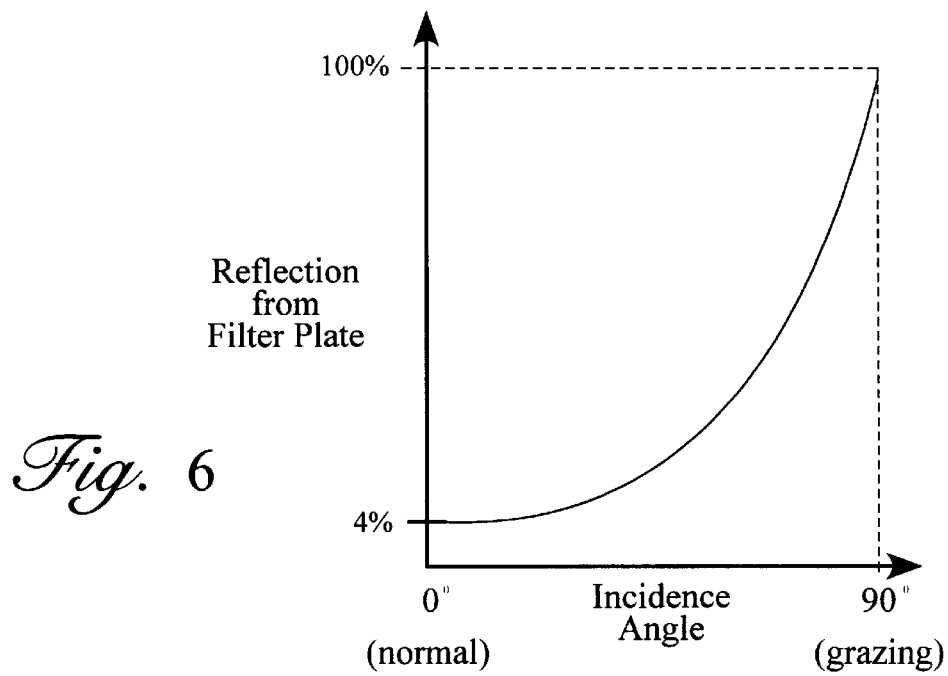
*Fig.* 6

INTEGRATING OPTICAL COLLECTOR WITH REDUCED RE-ILLUMINATION OF PHOSPHOR SHEET

TECHNICAL FIELD

The present invention relates to optical radiation collectors for storage phosphor imaging systems, and in particular relates to diffusely reflective integrating radiation collectors with wavelength selective characteristics.

BACKGROUND ART

A storage phosphor sheet retains a stored image when exposed to an image-wise pattern of ultra short wavelength radiation, such as X-rays. The stored latent image may then be read by illuminating the phosphor sheet with radiation of a relatively long stimulation wavelength, typically red or infrared light. Upon stimulation, the phosphor emits radiation in a shorter emission wavelength band separated from the stimulating wavelength band, typically green, blue, or ultraviolet light, with an emitted intensity proportional to the quantity of ultra short wavelength radiation to which the phosphor had been originally exposed when the latent image was recorded. In a typical phosphor imaging system, the phosphor sheet storing a latent image is stimulated with a scanning beam, such as a laser beam, at the stimulation wavelength illuminating successive spots on the phosphor sheet. The emitted radiation from an illuminated spot of the phosphor sheet is collected by an optical collector and sensed by a photodetector, such as a photomultiplier tube, to produce electronic image signals corresponding to the intensity of the emitted radiation.

One relatively simple imaging system is described by Matsuda et al. in U.S. Pat. No. 4,680,473. Radiation emitted from the phosphor sheet enters a light guide member through an input face positioned close to the scan line on the phosphor and is directed by the light guiding member to a photomultiplier. In order to improve collection efficiency, a mirror is positioned to specularly reflect more of the emitted radiation to the guide member's input face. In one embodiment, the mirror has a specular reflection surface that selectively reflects radiation at the phosphor's emission wavelength, but either transmits through the mirror or absorbs (and in any case, does not reflect) radiation at the stimulating wavelength. In another embodiment, a filter plate, which transmits the emission wavelength but absorbs the stimulating wavelength, is placed between the scan line and the mirror. Radiation emitted from the phosphor is directed toward the mirror and passes once through the filter plate on its way to the mirror and once more on its way from the mirror to the guide member. In either embodiment, the input face of the light guiding member may have an anti-reflection surface coating that minimizes or eliminates reflection of both the emission and stimulating wavelengths, while a filter at the back of the light guiding member blocks the stimulating wavelength from being received by the photomultiplier. By reducing the reflection of the stimulating wavelength from the mirror or the light guiding member's input face, the stimulating radiation can be prevented from re-illuminating the phosphor in areas outside of the scan spot.

It is desirable to collect as much of the emitted radiation as possible and to direct it to the photodetector with little, if any, positional variation in the amount of radiation collected, in order to obtain a strong signal. With that objective in mind, other more efficient collectors have been developed. One such collector is described by Hideo Noda in the Japanese Patent Application Laying-Open No. 6-160311, published Jun. 7, 1994. The collector includes a set of fluorescence-reflecting flat mirror plates essentially forming the sides of an open box, with the open side adjacent to the recorded surface of a phosphor imaging plate and the opposite side containing a photomultiplier tube receiving emitted fluorescence through a noise removing filter that transmits only the fluorescence wavelength (about 390 nm). One of the fluorescence reflecting sides is a dichroic mirror that transmits excitation radiation (a 633 nm wavelength laser beam) from an optical source. Diagonally disposed inside the collector is another dichroic mirror that reflects the excitation beam from the laser source and directs it to the recorded surface of the phosphor plate, but transmits fluorescence emitted from phosphor to the photomultiplier tube.

While such a configuration is adapted to collect the phosphor's fluorescence emission for detection by a photomultiplier tube, it inherently allows re-illumination by stimulating radiation in regions of the phosphor outside of the spot illuminated by the excitation laser beam. This is because some of that excitation light is not absorbed by the phosphor plate but reflects or scatters therefrom and is collected along with the fluorescence. Although the excitation is blocked by the diagonal dichroic mirror and the noise rejecting filter from reaching the photomultiplier tube, the mirror sides of the collector together with the diagonal dichroic mirror reflect radiation of the stimulating wavelength so that some of it can re-illuminate the phosphor.

One solution to this problem is provided in the collector described in U.S. Pat. No. 5,598,008 to Livoni. That patent teaches a hollow cylindrical, ellipsoidal, or spherical collector with a wavelength selective diffusely reflective interior surface coating. The diffusely reflecting interior coating helps to smooth out the signal variations that are a result of the position of the stimulating radiation beam along the scan path. The coating is a barium sulfate based material that is doped so as to absorb radiation of the stimulating wavelength, while still highly reflecting radiation in a phosphor's emission wavelength band. Unfortunately, diffuse reflection coatings with the required high reflectance (near 98%) at the emission wavelengths that need to be collected, lack sufficiently low reflectance at the stimulating wavelength to sufficiently minimize re-illumination. Coating materials simply do not provide the desired reflectance range. At best, a reduction to about 80% reflectivity at the stimulation wavelength is possible. Lower reflectances require reducing the reflectance at the emission wavelengths as well, reducing the amount of light collected.

Accordingly, it is an object of the invention to minimize re-illumination at the stimulating wavelength in diffusely reflective integrating collectors, by providing an optical radiation collector arrangement with much lower reflectance at the stimulating wavelength than can be provided by known wavelength selective surface coatings.

DISCLOSURE OF THE INVENTION

The object has been met by a wavelength selective optical collector that employs at least one absorptive filter, preferably in the form of a filter plate, disposed within the interior of the collector body in a location that divides, and preferably approximately bisects, that interior. The filter is selectively transmissive of the phosphor's emission wavelength band, but absorptive at the stimulating wavelength band, and the location of the filter in the interior of the collector tends to maximize the number of passes through the filter by the collected radiation before it has a chance to re-illuminate the phosphor surface. Color filter plates are low-scatter bulk absorbers of selective wavelength bands. The absorption characteristics of the color filter plates are not dependent upon the angle of the radiation impinging on the filter plates, except that radiation at a large angle that traverses a plate will be attenuated to a larger degree because the internal distance of the light path through the plate will be greater. Hence, filters with transmittances of 95% or better (preferably, at least 98%) in the emission wavelength band of the phosphor and transmittance of 1% or less (preferably, on the order of $10^{-5}$ per pass) at the stimulating wavelength can be selected for use in the collector.

Accordingly, the invention is an optical collector having a hollow body, typically cylindrical in shape, with at least one slit therein aligned with the scan line on the storage phosphor for admitting emitted radiation from the phosphor into the interior of the collector. Where there are two slits located on opposite sides of the body, this would allow passage of the scan beam therethrough. The interior surface of the collector has a high diffuse reflectivity for the emission wavelength band, but need not have any particular wavelength selective response. The filter (or filters) spans the entire length of the slit and is preferably located adjacent to the slit or slits in a position that nearly bisects the collector but does not obstruct the scan beam's path through the collector. If only one filter is used, it is preferably located on the detector side of the collector. If two filters are used, they may be parallel to each other on opposite sides of the slits in the collector, one on the detector side of the collector and one on the opposite side from the detector. They could also be oriented at an angle relative to each other, may be flexible film sheets instead of rigid plates, and may even be curved rather than planar.

BRIEF DESCRIPTION OF THE DRAWINGS

FIG. 5 is a side sectional view corresponding to FIG. 3 of an alternative embodiment of a light collector of the present invention.

FIGS. 6–9 are respectively a graph of reflection versus incidence angle, a geometrical diagram of multiple reflections from angled filter plates, and a schematic close-up of a portion of FIG. 5, illustrating aspects of the alternate embodiment.

BEST MODE OF CARRYING OUT THE INVENTION

Figure 1:
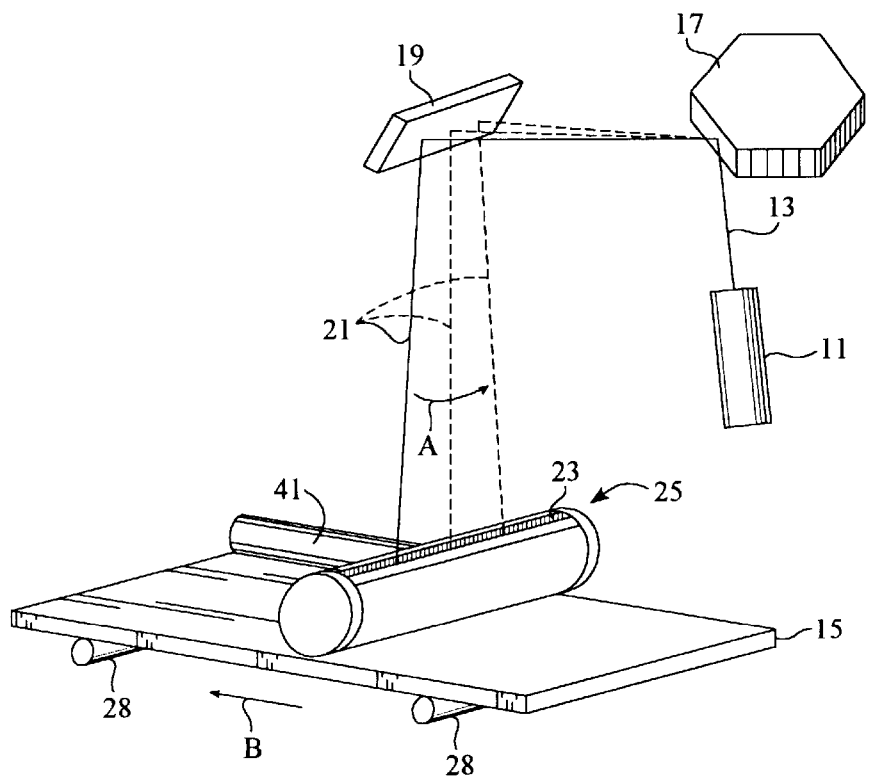
FIG. 1 is a perspective view of an optical collection and detection system for reading storage phosphor plates, according to the present invention.

With reference to FIG. 1, a storage phosphor imaging system in accord with the present invention includes a radiation source 11, such as a laser, producing a beam 13 that is directed along a path to a phosphor medium 15 storing a latent image therein. Various storage phosphor sheets are commercially available, such as from Fuji Photo, Agfa and Eastman Kodak. For example, Fuji Photo's storage phosphor plate designated as part no. R230140ST5, the Kodak type GP25 storage phosphor sold under catalog no. 880-4387, and Agfa's type ADC-MD storage phosphor designated as part no. 3GCYG, are representative of the various phosphor media 15 that could be used. A scanning device, such as a rotating polygonal scanner 17 or a galvanometer scanner (for example, from General Scanning Inc. of Watertown, Mass.), is placed in the path of the beam 13. The beam 13 reflecting from the scanner 17 is then reflected by a mirror 19 to traverse the phosphor plate 15 along a path parallel to the two slits 23 and 23' (in a two-slit embodiment) in the collection cylinder 27. The scanning beam passes through slits 23 and 23' (seen in FIG. 3) forming entrance and exit apertures in the cylindrical radiation collection and detection system 25. The scanning beam 21 impinges upon the phosphor sheet 15 along a scan line defined by the sweep of beam 21 in a first direction A, while the sheet 15 is moved by transport means, represented simply by rollers 28, in a second direction B.

The beam 13, provided by the source 11, has a wavelength within the stimulation wavelength band for the particular storage phosphor medium 15 being scanned, causing the medium to emit radiation at an emission wavelength that differs from the stimulation wavelength. The emitted intensity is proportional to the energy stored in the locally illuminated area or spot of the phosphor, which stored energy is proportional to the quantity of radiation used to record the latent image in that local area. Storage phosphor plates are available in a variety of different storage, stimulation and emission wavelength characteristics. A typical phosphor medium that has a stimulating wavelength in a range of 900 to 1050 nm, such as a 975 to 980 nm (infrared) stimulating wavelength, may have an emission wavelength in a range from 400 to 550 nm (blue or green). Other phosphor media might have a shorter stimulation wavelength in a range from 635 to 680 nm, for example 650 nm (red), yet have an emission wavelength in the same 400 to 550 nm range or a shorter 350 to 450 nm (ultraviolet or blue) range. A laser source 11 emits essentially a single wavelength that is selected to be within the stimulating wavelength band of the particular phosphor sheet 15 being illuminated by the scanning beam 21. That same laser wavelength might also be within stimulating wavelength bands for other storage phosphors, allowing a choice of several possible media to be used in the system, subject to other emission wavelength constraints imposed by the collection system to be described below.

Figure 2:
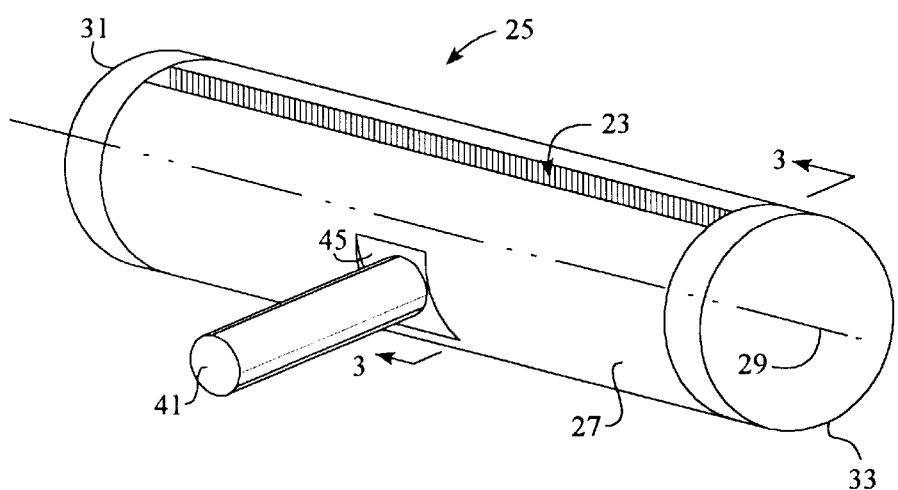
FIG. 2 is a perspective view of the optical collector of the present invention in the system of FIG. 1.
Figure 3:
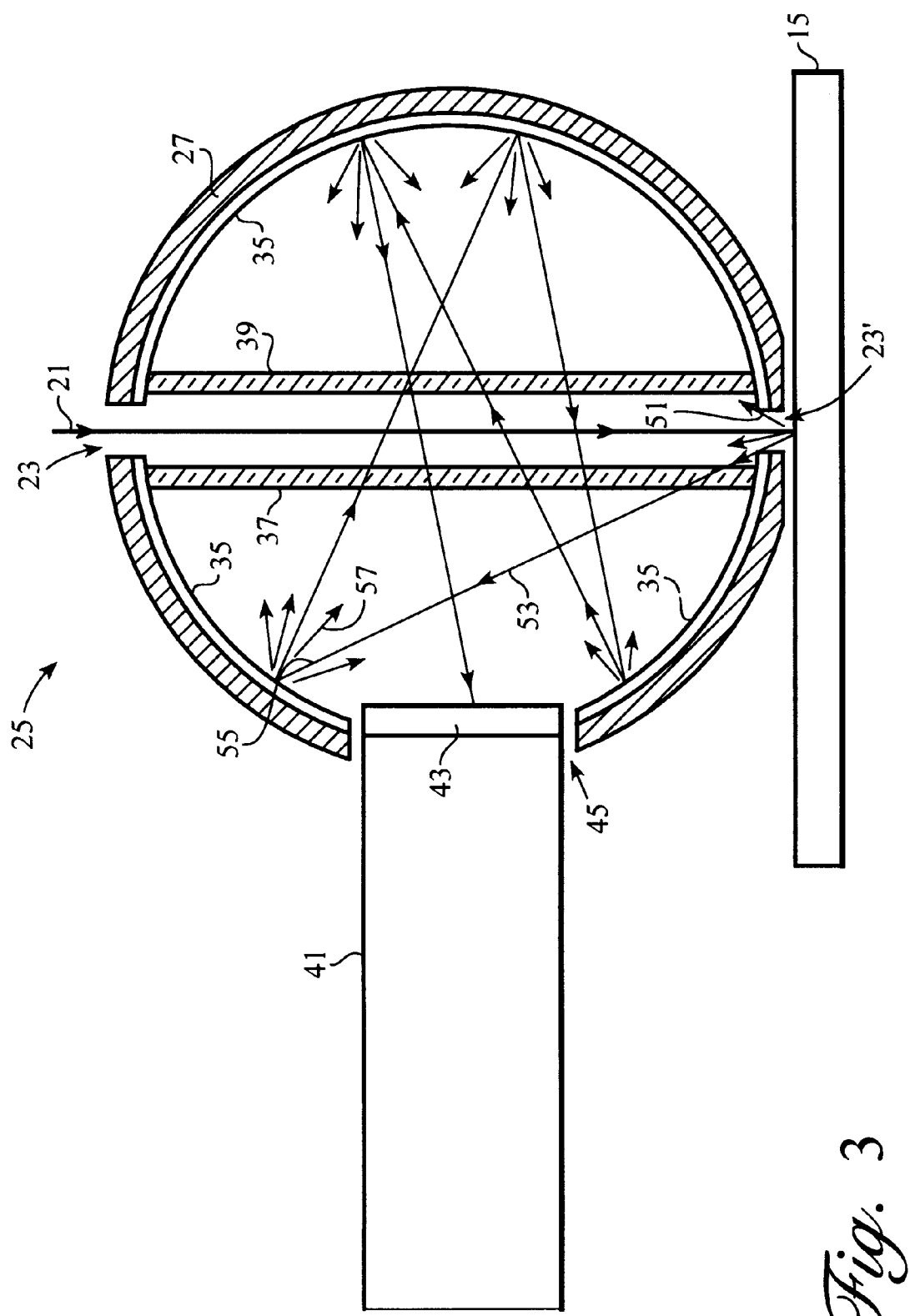
FIG. 3 is a side sectional view taken along the lines 3—3 in FIG. 2, showing the interior of the optical collector of the present invention.

With reference to FIGS. 2 and 3, a preferred embodiment of the collection and detection system 25 includes a hollow cylindrical body 27 extending along a longitudinal axis 29 between end caps 31 and 33. A first slot 23, defining an entrance aperture for the scanning radiation beam 21, extends parallel to the longitudinal axis 29 and between the end caps 31 and 33. A second slot 23', defining an exit aperture for the beam 21 proximate to the storage phosphor sheet 15, is disposed approximately opposite to and co-extensive with the first slot 23. The second slot 23' extends parallel to the scan line formed by the beam 21 on the phosphor 15. The interior of the cylindrical body 27 provides an unobstructed path for the scanning excitation beam 21 from the entrance aperture 23 to the exit aperture 23'.

The internal surface of the cylindrical body 27, including the end caps 31 and 33, is coated with a diffusively but highly reflective layer 35. This coating 35 may be formed from a commercially available barium sulfate compound, such as that sold under the trademark SPECTRAFLECT by Labsphere, Inc. of North Button, N.H. or that sold as catalog number 1181759 by Eastman Kodak Co., Inc. of Rochester, N.Y. The coating material should have an extremely high diffuse reflectivity in at least the emission wavelength band (typically, in a range from 400 to 550 nm, as previously noted), preferably in excess of 95%. The coating material might also have a lower reflectivity at the stimulating wavelength, for example less than 20%, but this property is not essential in view of the presence of one or more filter plates 37 and/or 39 in the present invention. Doping the coating material with dysprosium oxide or ytterbium oxide, or with an organic dye compound, can provide that lower reflectivity, if desired. That tailored cavity is described in U.S. Pat. No. 5,598,008, assigned to Lumisys, Inc. Normally, a material with very high reflectivity at all wavelengths would be used, as this enables the surface coating to be optimized for best reflectance at the emission wavelengths.

At least one, and preferably two, absorptive filters 37 and 39, typically in the form of glass plates, are placed within the cylindrical interior space of the collector 25 in positions that nearly bisect that cylindrical space and with orientations that are substantially parallel to the scan plane of the beam 21. If only one filter plate is used, it is preferably in the position of plate 37 which is on the same side of the scan plane as the photodetector 41, in order to supplement the attenuation at the stimulation wavelength provided by the bandpass filter 43 in front of photodetector 41. The primary function of the photodetector's filter 43 is to prevent radiation other than that within the emission wavelength band (or a selected portion of that band) from reaching the photodetector 41. However, this is only a secondary function of the filter plate 37, and thus the placement on the photodetector side of the collector 25 of the filter plate 37 when only a single filter plate is used is optional. Accordingly, a single filter plate in the position of plate 39 on the opposite side of the slits 23 and 23' from the detector 41 could be employed instead.

In a further embodiment seen in FIG. 5, two filter plates 77 and 79 are installed inside a collection cylinder 67 with an orientation such that the filter plates 77 and 79 are not substantially parallel to each other (as in FIG. 3), but instead lie at an angle to each other, still approximately bisecting the cylinder 67. The two filters 77 and 79 are positioned on opposite sides of the scan plane defined by the scanning stimulation beam 71, and the filter plates 77 and 79 do not cross the scan plane, so that the scanning beam 71 is unobstructed. As before in the embodiment of FIG. 3, the scanning beam 71 passes through slits 73 and 73' in the collection cylinder. Also, the interior surface of the collection cylinder 67 has a highly diffusely reflective coating 69 deposited thereon. A photodetector 85, typically having a wavelength selective bandpass filter 83 in front of it, extends into a side of the cylinder 67 to detect the collected radiation locally emitted from the phosphor plate 15 being stimulated by the beam 71.

One advantage of this angled arrangement of the filter plates 77 and 79 over the parallel arrangement of FIG. 3 is that the emitted radiation from the phosphor medium 15 passing through the slit 73' impinges on the filter plates 77 and 79 at a smaller incidence angle with respect to the normal of each plate. As seen in FIG. 6, it is a known effect that as the incidence angle of radiation on a plate approaches perpendicular incidence (0°), the reflection from the surface approaches a minimum value, $R_{min} \approx (n-1/n+1)^2$, where n is the refractive index of the plate material relative to air. (For n=1.5, $R_{min} \approx 4\%$.) But as the incidence angle approaches 90° (grazing incidence), the reflection approaches 100%. Accordingly, angling the filter plates 77 and 79 to reduce the incidence angle of the emitted radiation onto the filter plates 77 and 79 provides less reflection of the radiation by the plates 77 and 79, and thereby increases the amount of desired radiation of the emission wavelength(s) that is transmitted through the filter plates 77 and 79 and ultimately detected by the radiation detector 85. It also increases the amount of radiation of the stimulation wavelength that has been scattered from the phosphor 15 which passes into the filter plates 77 and 79 and thus absorbed, instead of being reflected by the plate surfaces.

Figure 7:
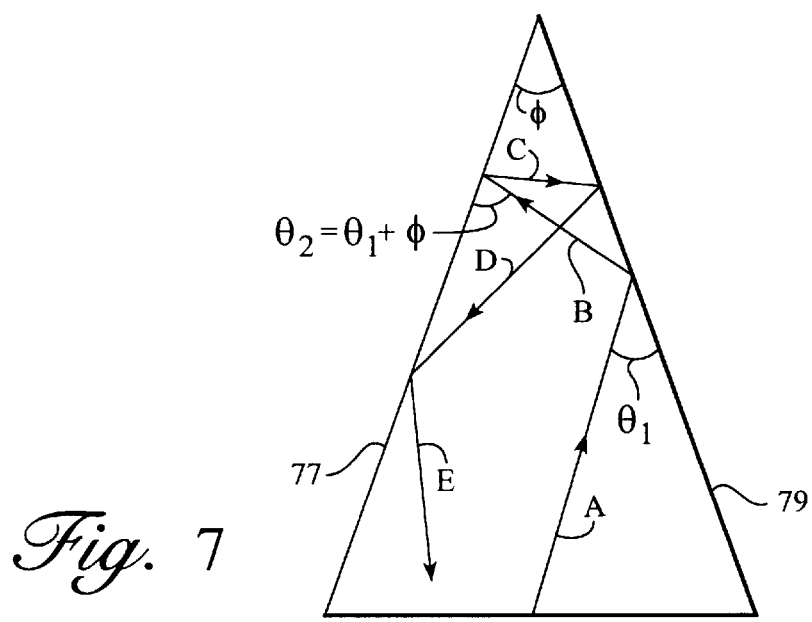

A second advantage of the angled filter orientation of FIG. 5 is that even the emitted radiation that is reflected in a first encounter with a filter plate may be transmitted in a second or subsequent encounter with a filter plate. This is represented in FIG. 5 by the radiation path 75'. Some of the emitted radiation 89 is transmitted through filter plate 79, while some of the radiation 87' is reflected by this first encounter with the filter plate 79. However, in subsequent encounters with the filter plates 77 and 79, the radiation 87' is increasingly transmitted, as represented by rays 89'. Likewise, scattered stimulation radiation that might be reflected from plates 77 and 79 have further opportunities to be coupled into the plates and absorbed before it can return to the phosphor medium 15. In part, this advantage is due to the geometry of the angled configuration highlighted in FIG. 7. Two sides of the illustrated triangle represent the filter plates 77 and 79 oriented at an angle $\phi > 0$ with respect to each other and the ray A represents emitted radiation impinging onto plate 79 at a first angle $\theta$, relative to the plate surface. (The incidence angle relative to the plate normal would be $90° - \theta_1$.) Ray B represents the radiation reflected from the surface of plate 79. It encounters plate 77 at a second angle $\theta_2$ relative to that plate's surface. Since the two plates 77 and 79 are angled relative to each other, $\theta_2 = \theta_1 + \phi$. Thus, it is seen that the second incidence ray B is closer to normal incidence than the first incidence ray A, and thus is more likely to be transmitted, as discussed previously with respect to FIG. 6. Also, it can be seen that the angled filter plates 77 and 79 do not "channel" radiation that is emitted substantially perpendicular to the phosphor's surface, but rather serve to return the emitted radiation after a number of reflections C, D, and E, so that it is not directed out through slit 73. Thus, the geometry can be seen to increase the amount of emitted radiation that is collected by the coated cylinder 67 and detected by detector 85.

A third advantage of the angled plate embodiment of FIG. 5 is that the filter plates can be made smaller in size and thus can be procured for a lower price.

Figure 8:
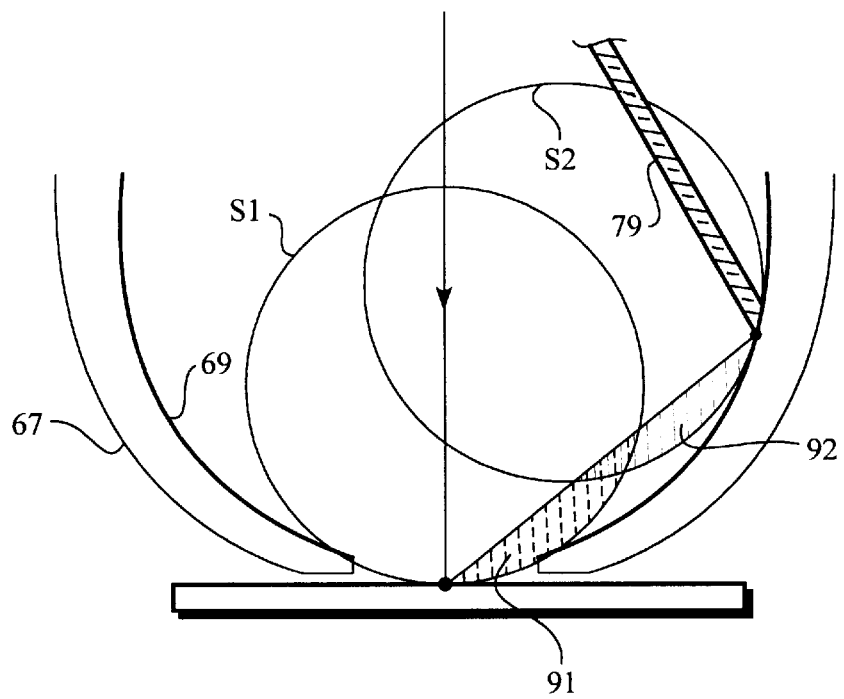

The angled orientation of the filter plates 77 and 79 does cause some (preferably less than 25%) of the diffusely reflective coated inner surface 69 of the collection cylinder to be exposed to the scattered stimulation radiation without the desirable absorption of the filter plates. This occurs at the lower end of the cylinder 67 near slit 73'. However, re-illumination is still reduced despite the exposed regions of the cylinder, as illustrated in FIG. 8, because the generally Lambertian profile of the scattering from the surface 69 means that the radiation missing the filter plates (e.g., plate 79) is of reduced intensity. In FIG. 8, the Lambertian profile is represented by circles S1 and S2. Only a small amount of the radiation S1 scattered from the phosphor medium, represented by the slice 91 misses the filter plate 79. of that radiation, the path that gives the largest return to the phosphor surface is that nearest the bottom edge of plate 79, represented by the circle S2, wherein the slice 92 represents the portion of the scattering from the coated surface of the collection cylinder 67 that re-illuminates the phosphor.

Thus, the benefits of angling the filter plates come at the cost of some increase in the level of re-illumination. Nevertheless, substantially all (preferably more than 95%) of the radiation admitted into the interior of the collector 67 through the slot 73' that happens to return to the slit 73' will have passed through one or both of the filters 77 and 79 at least twice (once in each direction), and only a very small percentage of the radiation that misses a filter will return to the slit 73' to re-illuminate the phosphor at the stimulation wavelength. The angle between the plates can be limited to a maximum value that keeps re-illumination below a predetermined acceptable level. This maximum acceptable re-illumination value is substantially equal to the square root of the actual emitted intensity that can be tolerated by the system, because the returned radiation will be further reduced by the same amount.

The primary function of the filter plate or plates 37 and 39, or 77 and 79, is to minimize re-illumination of the storage phosphor 15 with diffusely reflected radiation of the stimulation wavelength from the collector 25 through slot 23', while not significantly reducing the collection efficiency of the emitted radiation from the storage phosphor plate 15. Returning to FIG. 3, radiation 51 from the illuminated spot on the phosphor sheet 15 is a mixture of specularly reflected and scattered radiation of the wavelength of the stimulation radiation and emitted radiation released from the latent image stored in the phosphor 15. This radiation is directed in various directions that are collected by the cylindrical collector 25. For illustration purposes, one radiation path 53 is highlighted. There are an almost infinite number of such paths within the cylindrical collector 25. The emitted radiation in this exemplary path 53 impinges on the diffusely reflective coating 35 on the inner surface of the cylindrical body 27 at a location 55. The diffusely reflected radiation 57 from this point is directed in various directions, some of which are back toward the slot 23' proximate to the phosphor 15. Through multiple reflections from the surface coating 35, much of this radiation eventually reaches the photodetector 41. The stimulation radiation in the exemplary path 53 is highly attenuated by the time it hits either slit 23' or the photodetector 41. The various radiation paths within the collector 25, such as the exemplary path 53, traverse the filter plates 37 and 39 many times. Because most of the radiation energy that is diffusely reflected from a surface 35 exits nearly normal from the surface and therefore is directed toward the opposite surface of the cylindrical body 27, the placement of the filter plate or plates 37 and 39 at a nearly bisecting position within the cylindrical body 27 increases the likelihood that any radiation re-illuminating the phosphor 15 through slot 23' will have passed many times through the filter plates 27 and 29. Indeed, even radiation from the first diffuse reflection, such as from location 55, which happens to be directed back toward the phosphor 15 will have passed through filter plate 37 twice.

The filter plates 37 and 39 are sheets of colored glass or plastic, typically about 1 to 3 mm thick. They can also be made of colored plastic films, or of clear glass or plastic that is coated with a thin absorptive coating. They have high transmissivity in the phosphor's emission wavelength band, preferably at least 95%, but which have high attenuation at the stimulation wavelength, preferably less than 1% transmittance per pass. Transmittances of 98% or more at the emission wavelengths and $10^{-5}$ or less at the stimulating wavelength would be near ideal. Color filters of this type are commercially available and are preferably characterized by low bulk (internal) scattering from the absorbers in the glass (or plastic), with surfaces polished smooth for low surface scattering and can be anti-reflection coated, if desired. For phosphors with infrared stimulation wavelengths (e.g., about 975 nm), Schott glass no. BG39 or Hoya glass no. CM500 might be used. For phosphors with visible red stimulation wavelengths (e.g., about 650 nm), Schott glass no. BG3 or Corning glass no. 5031 might be used. One source of colored plastic filters is the Filtron Division of Gentex Corporation located in Carbondale, Pa.

Figure 4:
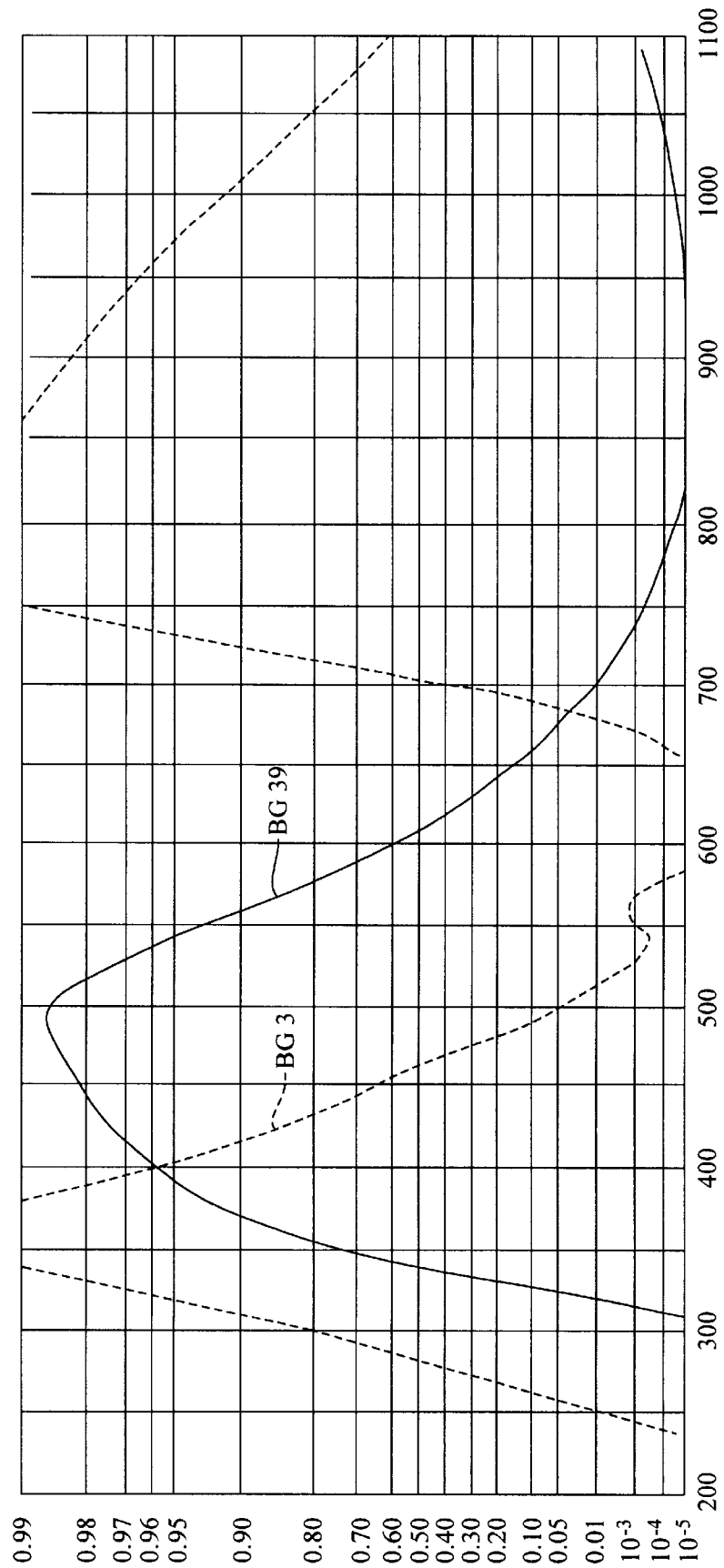
FIG. 4 is a graph of transmittance various wavelength for 1 mm thick filter plates for use in the optical collector of FIGS. 1–3.

FIG. 4 shows transmittance values versus wavelength for 1 mm thick sheets of the two aforementioned Schott glasses BG3 and BG39. These are representative of the many color filter glasses that are commercially available. It can be seen that BG3 has high transmissivity in the near ultraviolet and extremely low transmittance ($<10^{-5}$) near 600 to 650 nm. This is important because photomultiplier tubes (PMTs) used to detect the collected radiation have significant sensitivity in the red. Although the transmittance begins to fall off in the visible 400–450 nm range, the low transmittance level at the stimulating wavelength will allow filters of less than 1 mm thick to be used to improve visible blue radiation transmittance while still obtaining very large absorption at the stimulating wavelength. (Note that in the logarithmic scale on the graph, thickness changes simply shift the transmittance curve up or down, accordingly, without changing its shape.) BG39, in contrast, has low transmittance in the near infrared near 900 nm and has high transmittance near 500 nm. Such filter plates are a substantial improvement over wavelength selective diffusely reflective coatings, which are only capable of providing a much lower range of absorptions. Thus, the SPECTRAFLECT barium sulfate coating material that is doped with a dysprosium oxide or ytterbium oxide absorber, which is used to coat the collector in prior U.S. Pat. No. 5,598,008 is only able to provide reflectance at the stimulating wavelength of at best not less than about 80% with an emission wavelength reflectance of about 97%.

Returning to FIGS. 2 and 3, the photodetector 41 is in optical communication with the interior of the collector 25 via a port 45 formed in the cylindrical body 27. Typically, the port 45 is centrally located relative to both ends 31 and 33. However, it is also possible for the port 45 to be formed through one of the end caps 31 or 33 instead of in the cylindrical body 27 itself. Moreover, while the detector 41 is shown as being placed directly in the port 45, the detector 41 could, if desired, be spaced apart from the port 45 and coupled to the collector's internal space via an optical fiber or other radiation guide connecting the port 45 to the detector 41. In any of these cases, it is important for proper operation of the system that the port 45 for the detector 41 be disposed off of the path between slots 23 and 23' of the scan beam 21 so that it will not sense radiation from the scan beam 21. The collection efficiency, i.e. the percentage of radiation entering the interior of collector 25 through slot 23' that reaches the detector 41, is related directly to the effective area of the face of the detector 41 relative to the total effective area of the slots 23 and 23' and any other loss sources. Hence, efficiency is optimized by keeping the slots 23 and 23' as narrow as possible and using a detector 41 with a large active area. Multiple detectors might also be used to obtain a large total active area that is the sum of the active areas of each of the individual detectors without sacrificing acquisition time. Any type of radiation detector 41 may be employed. While a photomultiplier tube is preferred, a CCD detector might also be used. Whatever detector is used, it produces electronic image signals corresponding to the intensity of the collected radiation that is sensed.

While cylindrical collectors are preferred, other collector shapes, including spherical, ellipsoidal, prism-shaped and polyhedral collectors, might also be used. Also, while a collector having both entrance and exit apertures allowing traversal of a scanning beam through the center of the collector is preferred, a collector having only a single slot for collecting the emitted radiation might be used in a system that provides back-illumination of a storage phosphor. In that case, the filter plate or plates would be employed to minimize re-illumination from any transmitted stimulation radiation that might be redirected by the collector onto the front of the phosphor sheet. Whatever form of collector is used, the filter plate or plates will be positioned within the collector in order to maximize the likelihood that any radiation re-illuminating the phosphor will have passed many times through the filter or filters and thus maximize attenuation of the stimulating wavelength.

Figure 9:
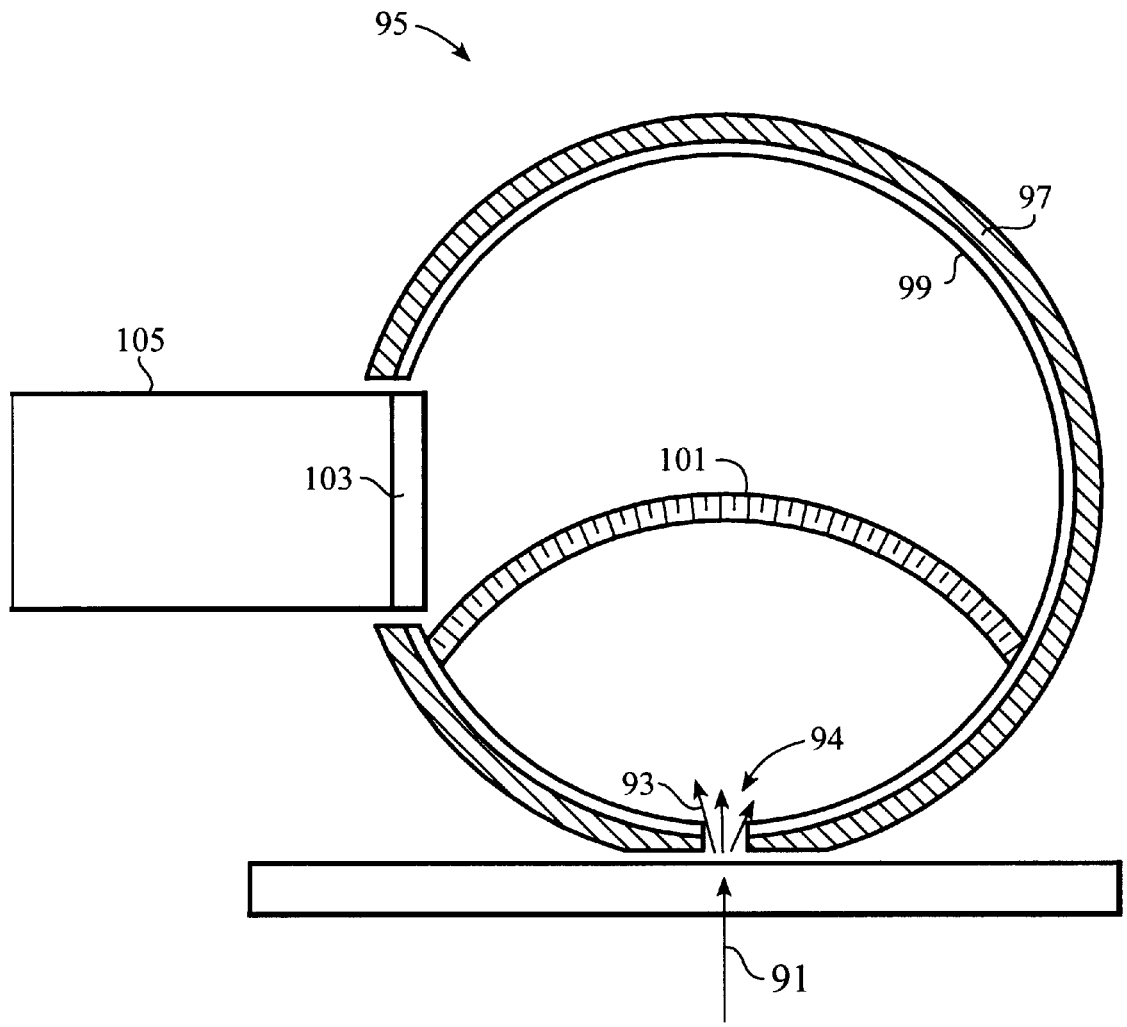

With reference to FIG. 9, an alternative embodiment in accord with the present invention exemplifies a number of possible variations that could be employed. Here the collector 95 is intended for collecting light emitted on the opposite side of the phosphor from where the stimulation beam 91 is directed. In that case, the collector 95 needs only one slit 94 for admitting the emitted light 93. Again the collector body 97 has an interior surface coating 99 that is diffusely reflective of the light and a wavelength-selective absorptive filter 101 is disposed within the interior space of the collector in a position so that the light received through the slit 94 and then diffusely reflected from the coating 99 will have to pass through the filter 101 at least once and preferably many times before either exiting through the slit 94 back onto the phosphor or being received by the detector 105 (with optional filter 103). In particular, the filter 101 isolates most of the diffusely reflective surface 99 from the slit 94, especially those portions of the surface 99 which tend to face the slit 94, so that much less than 50% and preferably less than 25% of the diffusely reflective surface 99 is directly exposed to light from the slit 94 without having first passed at least once through the filter 101. Thus, reillumination of the phosphor with light of the stimulating wavelength is minimized. Because there is only one slit 94 and the illumination beam 91 need not pass through the collector 95 to reach the phosphor, and thus the filter 101 may, if desired, be oriented more nearly parallel to the phosphor than any of the filters in FIGS. 3 or 5. Also, the filters in any of these collector systems need not be planar, but could instead be curved, as shown by filter 101. (In the particular configuration of FIG. 9, the filter 101 should be antireflection coated, or curved or tilted in a manner that minimizes specular reflection of the light back through the slit 94.) Other embodiments are also possible, including those with more than two filters.

What is claimed is:

1. A wavelength selective optical radiation collector, comprising:
   a hollow body with a diffusely reflective interior surface and with at least one linear slit formed therein defining an aperture for admitting light into the interior of said body;
   at least one wavelength-selective absorptive filter disposed in said hollow body spanning substantially the entire length of the slit and dividing the interior of said body such that at least approximately 50% of said diffusely reflective interior surface is isolated from said slit by said filter, wherein substantially all of the light admitted through said slit into the interior of said body that returns to said slit has passed through said filter at least twice; and
   a photodetector in optical communication with said interior of said body;
   wherein said filter is chosen to be substantially transmissive within a first wavelength band and to be substantially absorptive at a second wavelength band, said filter being substantially non-angle-dependent in its absorptive characteristics.

2. The collector of claim 1 wherein said hollow body is a cylinder with a longitudinal axis aligned with said linear slit.

3. The collector of claim 2 wherein said interior surface is coated with a diffusely reflective layer with a reflectivity of at least 95% at least in said first wavelength band.

4. The collector of claim 3 wherein said diffusely reflective layer comprises a barium sulfate coating.

5. The collector of claim 1 wherein said body has two linear slits formed parallel to each other on substantially opposite sides of said body, with said filter extending adjacent to both said slits so as not to obstruct a light path between said slits.

6. The collector of claim 5 wherein two absorptive filters are disposed in said hollow body on opposite sides of said slits.

7. The collector of claim 6 wherein said filters are parallel to each other and to a plane defined as passing through both slits.

8. The collector of claim 7 wherein said diffusely reflective coating layer has a reflectivity of at least 95% at least in said first wavelength band.

9. The collector of claim 6 wherein said filters are oriented at a non-zero angle relative to each other.

10. The collector of claim 1 wherein said body has one linear slit formed therein, said at least one filter extending in the interior of said body over said slit.

11. The collector of claim 10 wherein said first wavelength band is of shorter wavelength than said second wavelength band.

12. The collector of claim 11 wherein said two filter plates are oriented parallel to each other.

13. The collector of claim 11 wherein said two filter plates are oriented at a non-zero angle relative to each other.

14. The collector of claim 10 wherein said filter plate is disposed adjacent said two slits on a detector side of said slits.

15. The collector of claim 10 wherein two filter plates are provided on opposite sides of said two slits.

16. The collector of claim 1 wherein said first wavelength band is of shorter wavelength than said second wavelength band.

17. The collector of claim 16 wherein said first wavelength band is approximately 400–550 nm and said second wavelength band is approximately 900–1050 nm.

18. The collector of claim 16 wherein said first wavelength band is approximately 350–450 nm and said second wavelength band is approximately 635–680 nm.

19. The collector of claim 18 wherein said first wavelength band is approximately 400–550 nm and said second wavelength band is approximately 900–1050 nm.

20. The collector of claim 18 wherein said first wavelength band is approximately 350–450 nm and said second wavelength band is approximately 635–680 nm.

21. The collector of claim 16 wherein said coating layer comprises barium sulfate.

22. A wavelength selective optical radiation collector, comprising:
   a hollow cylindrical body with a longitudinal cylinder axis defined thereby, said body having two linear slits forming light apertures disposed parallel to said longitudinal axis on opposite sides of said body, said body having an interior surface with a diffusely reflective coating layer thereon;

a photodetector in optical communication with the interior of said cylindrical body disposed away from both of said slits; and at least one wavelength selective filter plate disposed in the interior of said hollow cylindrical body and substantially bisecting the interior of said body without obstructing a light path between said slits, wherein said at least one filter plate is substantially transmissive within a first wavelength band and substantially absorptive at a second wavelength band.

23. A light scanning, collection and detection system, comprising:

a light source providing a scanning beam of a stimulating wavelength as an illuminating spot along a scan line onto a sample surface, said surface being stimulated by said illuminating spot to release latent energy as optical radiation in an emission wavelength band, a hollow radiation collector in the form of a body with a diffusely reflective interior surface, said collector having at least one slit disposed in said body to admit radiation emitted from said sample surface into the interior of said body;

a detector in optical communication with the interior of said body of said collector disposed away from said path of said scanning beam and disposed to receive and detect radiation from said sample surface which is collected by said diffusely reflective interior surface of said collector body;

wherein said collector body has at least one wavelength selective filter plate disposed therein substantially bisecting said interior of said collector body, said filter plate being substantially transmissive within said emission wavelength band of said sample surface and substantially absorptive of said stimulating wavelength.

24. The system of claim 23 wherein said collector has two parallel slits therein disposed on substantially opposite sides of said body to permit passage of said scanning beam through said body to said sample surface, said emitted radiation from said sample surface admitted into the interior of said body through one of said slits.

25. The system of claim 24 wherein said collector body has two wavelength selective filter plates disposed therein on opposite sides of said slits.

26. The system of claim 25 wherein said two filter plates are oriented parallel to each other.

27. The system of claim 25 wherein said two filter plates are oriented at a non-zero angle with respect to each other.

* * * * *